June 11, 1929.  C. H. BRASELTON ET AL  1,716,759
VIBRATION OPERATED PUMP
Original Filed Feb. 18, 1922
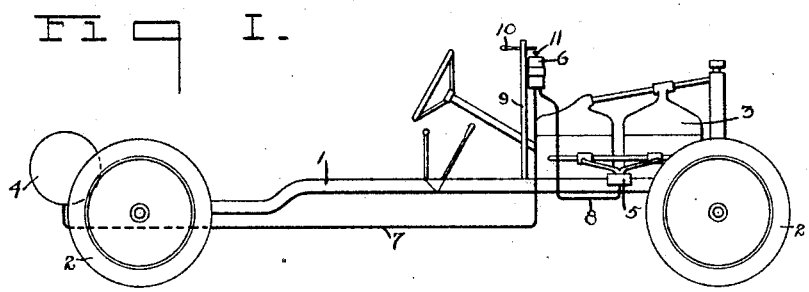
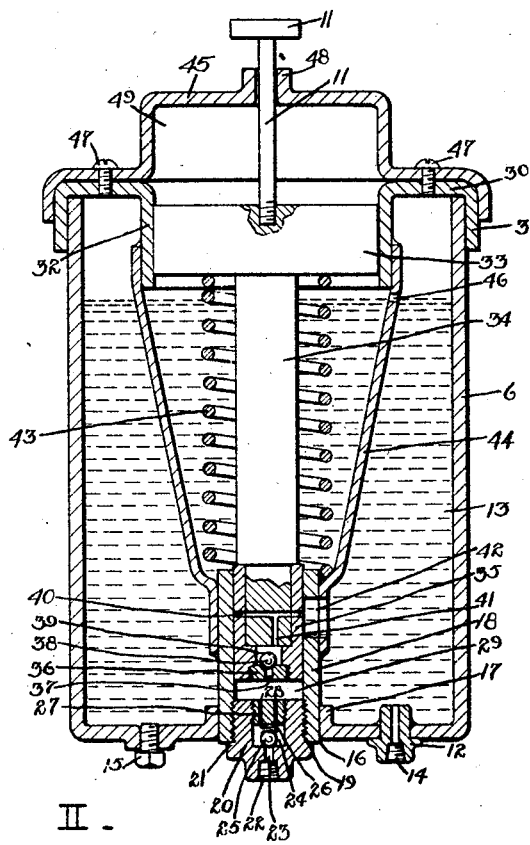
INVENTOR.
Chester H Braselton
and Fred B. MacLaren
BY
Chester H Braselton ATTORNEYS.

Patented June 11, 1929.

1,716,759

UNITED STATES PATENT OFFICE.

CHESTER H. BRASELTON, OF NEW YORK, AND FRED B. MacLAREN, OF MALBA, NEW YORK; SAID MacLAREN ASSIGNOR TO SAID BRASELTON.

VIBRATION-OPERATED PUMP.

Application filed February 18, 1922, Serial No. 537,583. Renewed August 18, 1927.

This invention relates to vibration operated pumps and pertains to various features of construction and design looking towards cheapness and simplicity of manufacture as well as efficient dampening or controlling means for controlling the amount of liquid pumped.

The invention constitutes an improvement of the construction shown in our copending applications entitled "Vibration operated pumping mechanism", filed Feb. 1, 1922, Serial No. 533,493, and "Inertia pumps", filed Jan. 30, 1922, Serial No. 532,718, in which applications the right to claim the invention broadly is hereby reserved.

The invention is shown in the drawings as applied to an automobile for the purpose of pumping liquid fuel from a supply tank of lower level into a higher reservoir from which it may flow to the carburetor.

In the drawings which accompany and form a part of this specification Figure I represents in a conventional manner an automobile with our invention applied thereto.

Figure II is a vertical sectional view of the pumping mechanism shown in Figure I.

In the drawings 1 represents the chassis of an automobile having the usual wheels 2, engine 3, rear fuel supply tank 4, carburetor 5, and our improved design of pump tank 6. This pump tank 6 is connected with the supply tank 4 by feed pipe 7 and with the carburetor 5 by feed pipe 8.

In Figure I pump tank 6 is shown fastened to the front part of the dash of the automobile although this may be connected in any convenient part of the automobile at a sufficient level so that the liquid will flow to the carburetor. The dash of the automobile is represented at 9 and this also carries a lever 10 pivotally mounted at its center and the forward end of which lever is adapted to cooperate with the upper end of plunger 11 of the pump tank whereby plunger 11 may be operated by the operator of the car by merely manipulating the lever 10.

In Figure II the pump tank is again represented at 6 the sides and bottom of the tank being preferably made of one piece of metal pressed into shape. The bottom has a coupling 12 screwed into it forming a passage from the inner chamber 13 of the pump tank to feed pipe 8 to the carburetor which feed pipe 8 is adapted to be connected by suitable coupling with screw threaded hole 14 of the connection 12. The pump tank being located preferably above the level of the carburetor liquid fuel will flow from the pump tank to the carburetor as needed by the latter. The bottom of the tank also has a plug 15 screwed into it which may be removed for draining the tank.

The bottom of the tank has a central aperture 16 and the metal is turned up at 17 adjacent this aperture to form a sufficient surface to receive a cylinder 18 which may be in any way permanently fastened in a liquid tight manner inside the opening 16. This may be fastened in by sweating, soldering or in any well known manner. The inside of the lower end of the cylinder 18 is threaded at 19 to receive a valve containing nut 20 having a shoulder 21 adapted to bear against the lower edge of the cylinder. A gasket not shown may be placed between the surfaces 21 and the lower edge of cylinder 18 to insure against leakage. The nut has a threaded opening 22 at its lower end which connects the opening 23 with a counterbored portion 24 containing a ball valve 25 cooperating with the edge of opening 23 which forms the valve seat. The light spring 26 normally holds the valve against its seat to prevent flow of liquid downwardly past the valve but this valve is adapted to yield to allow flow in the opposite direction. The spring is held in place by the screw plug 27 having apertures 28, this plug screwing into the upper end of the counterbore 24. The apertures 28 connect the valve chamber 24 with pump chamber 29 in the cylinder.

On top of the pump tank 6 is secured by soldering or any other convenient manner a guide member 30 having a downwardly bent outer flange 31 surrounding the outer edge of the tank and having an inwardly depending annular flange 32 inside the tank. The inside diameter of the depending flange 32 is made true and in alignment axially with its axis the same as the axis of the cylinder 18. This flange 32 is therefore adapted to form a guide for an enlarged portion 33 of a piston 34 the lower end of which is surrounded with a bushing 35 working in the pump cylinder. This bushing 35 carries a threaded nut 36 at its lower end having an opening 37 the upper end of which forms a seat for ball valve 38 working in valve chamber 39. This valve chamber is connected by openings 40 and 41 in the lower end of the piston and bushing through openings 42 to the liquid receiving space 13 of the pump tank. Reciprocation of the piston in the pump cylinder serves to alternately draw liquid fuel from the rear tank into the pump chamber past valve 25, and, on the downward stroke of the piston, to force the liquid from the pump chamber past valve 38 through openings 41 and 42 into the pump tank space 13.

A spring 43 is mounted around the piston 34 with its lower end bearing on the top of the cylinder or against the inside of casing 44 and the upper end bearing against the lower surface of the enlarged portion 33 of the piston. This spring serves to normally hold the piston in a point of balance from which it may move in either direction as the pump tank casing is vibrated either intentionally or by the movement of the vehicle or vibration of the engine.

Surrounding the spring 43 is a conical casing 44 the upper end of which fits over and is secured to the outer surface of the depending flange 32 and the lower end of which fits over and is secured to the outer surface of cylinder 18 these fits being such as to form a substantially liquid tight connection or at least a connection such that liquid will not flow freely between the surfaces. This casing is formed with an opening 46 whereby the interior of the casing at a certain elevation may communicate to the exterior. The purpose of this is that when the liquid rises in the outer portion of the tank space 13 to a level of the opening 46 or above, the conical casing will then fill to the same level with the liquid and then the enlarged portion 33 of the piston will, when the liquid is of sufficient level, have to act in its vibration against liquid in the inside of the conical chamber which will then have the effect of dampening the vibration of the piston and thereby stop perfect pumping operation of the same until the liquid in the space 13 again falls to below the opening 46 when the operation of the piston will then be free as the portion 33 will be working against air on its two sides. We do not desire that the fit between the large portion 33 of the piston and the flange 32 be the closest sort of fit but it is permissible for this to be such that air may escape between the surfaces. The top of the piston is connected by a rod 11 through a cap 45 flanged to fit over guide 30 and fastened thereon by screws 47. It is desired that a fairly loose fit exist between rod 11 and boss 48 of the cap which serves as a guide for the rod 11. In this way by pushing the rod 11 up and down the piston of the pump may be positively operated to pump liquid into the chamber 13 when desired. This rod 11 may be operated as above described, from the dash when desired.

The operation of the above mechanism will be aparent from the description given and any vibration of the tank 6 caused either by the running of the automobile over the road or the vibration of the engine will automatically cause a pumping operation of the pump. The piston 34 and head 33 being made relatively heavy so as to constitute an inertia element of sufficient strength that the piston will not completely follow the movement of the casing 6 and so that any resulting movement between the piston and its cylinder will cause the pumping operation above described. When the liquid in the tank is of sufficient level to be equal to the height of the opening 46 or above the same the space in the conical chamber 44 will be filled with liquid and this will resist or dampen the movement of the enlarged head 33 of the piston to reduce or prevent further pumping operation until the level in the tank falls and the liquid flows from the space below the enlarged portion 33 through opening 46 into the pump space 13. Any suitable gasket may be formed and placed between the cap 45 and guide member 30 to prevent leakage of the liquid that might otherwise splash out of the tank. A chamber 49 is provided above the enlarged portion 33 of the piston to provide an air space above the same and a space in which any splashing may take place and prevent any liquid being splashed out of the tank through the space around the rod 11 inside the boss 48.

Having described our invention what we claim is:

1. The combination of a pump casing, a pump cylinder carried thereby; an inlet and an outlet for said cylinder; an inertia piston working in the pump cylinder; a guide for the upper end of the piston and carried by the casing; yielding means for normally maintaining the piston in a point of balance with respect to the pump cylinder; a casing having an aperture therein cooperating with the guide and the pump cylinder to provide a dampening chamber to dampen the vibrations of the piston when the liquid in the pump tank surrounding the casing reaches a predetermined level and manual means for vibrating said piston.

2. The combination of a pump casing having a pump cylinder at its lower end; an inlet and an outlet for said cylinder; an inertia piston working in the cylinder and guided thereby at its lower end; a guide for the upper end of the piston carried by the upper end of the pump casing; means for yieldingly supporting the piston at a point of balance; and means having an aperture therein connecting the guide and pump cylinder for forming a dampening chamber to dampen the operation of the piston when the liquid reaches a sufficient level in the liquid receiving chamber of the tank.

3. In a vibration operated pump, the combination of a casing; a pump cylinder within and attached to the base of said casing and having an inlet and an outlet; a piston movable in said cylinder, said piston extending to a point adjacent the top of said casing; a guide depending from the top of the casing for the piston; and means having an aperture therein, including a secondary casing within the main casing and connecting said guide means and said cylinder for dampening the movement of the piston.

4. In inertia operated pump mechanism, the combination of a main casing having a base and top portion; a cylinder within and attached to the base of said casing and having an inlet and an outlet; a piston movable in said cylinder and extending to a point adjacent said casing top; a piston operating mass attached to the piston and movable therewith; guide means depending from the casing top adapted to engage said piston operating mass; and a secondary chamber connecting the cylinder and guide means within the casing and having an aperture therein, said secondary casing forming a dampening means for the movement of the piston.

5. A device of the class described including a main casing; a secondary casing within said main casing; pump mechanism having an inlet and an outlet and including a cylinder and piston within the secondary casing; and means for moving said piston, said secondary casing having an aperture connecting the interior of said secondary casing to the interior of the main casing.

6. In pump mechanism, the combination of a casing with a cap therefor, said cap including a base plate having an annular downturned outer flange; a top plate having an outer flange engaging the flange of the base plate, said top plate being open at its central point; a secondary casing connected to and depending from the base plate flange; and pumping mechanism positioned in said secondary casing, said secondary casing having an aperture connecting with said first mentioned casing.

7. In pump mechanism the combination of a casing with a cap therefor, said cap including a base plate having an annular down-turned outer flange and a top plate having an outer flange engaging the flange of the base plate, said top plate being open at its central point; a secondary casing having an aperture therein connected to and depending from the base plate flange; pumping mechanism positioned in said secondary casing; and manual means reciprocable within the central point opening of the top plate and connected to said pumping mechanism whereby the pumping mechanism may be optionally manually reciprocated.

In testimony whereof, we affix our signatures.

CHESTER H. BRASELTON.
FRED B. MacLAREN.